United States Patent
Tiemann

(10) Patent No.: US 7,131,813 B2
(45) Date of Patent: Nov. 7, 2006

(54) TURBINE ENGINE AND A METHOD FOR COOLING A TURBINE ENGINE

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 248 days.

(21) Appl. No.: 10/681,519

(22) Filed: Oct. 8, 2003

(65) Prior Publication Data

US 2005/0025614 A1    Feb. 3, 2005

(30) Foreign Application Priority Data

Oct. 21, 2002    (EP)    .................. 02023472

(51) Int. Cl.
*F01D 5/08* (2006.01)
(52) U.S. Cl. .............. 415/115; 415/116; 416/97 R
(58) Field of Classification Search .............. 415/1, 415/115, 116; 416/97 R
See application file for complete search history.

(56) References Cited

U.S. PATENT DOCUMENTS

| | | | | |
|---|---|---|---|---|
| 3,572,966 A | * | 3/1971 | Borden et al. | ............... 416/95 |
| 5,525,032 A | * | 6/1996 | Kreis et al. | ................... 415/1 |
| 5,695,319 A | * | 12/1997 | Matsumoto et al. | .......... 416/95 |
| 5,758,487 A | * | 6/1998 | Salt et al. | ................... 60/806 |
| 5,795,130 A | * | 8/1998 | Suenaga et al. | ............. 416/95 |
| 6,019,573 A | * | 2/2000 | Uematsu et al. | ........... 415/115 |
| 6,195,979 B1 | | 3/2001 | Fukuyama | |

FOREIGN PATENT DOCUMENTS

| | | |
|---|---|---|
| EP | 0 806 544 | 11/1997 |
| EP | 0 900 919 | 3/1999 |

\* cited by examiner

*Primary Examiner*—Edward K. Look
*Assistant Examiner*—Nathan Wiehe

(57) ABSTRACT

A turbine engine with a turbine shaft which has a number of disks arranged adjacent to one another, to each of which a number of blades are fastened in a star arrangement, wherein these blades can be cooled with at least one coolant which flows through coolant channels inside the blades is provided.

9 Claims, 1 Drawing Sheet

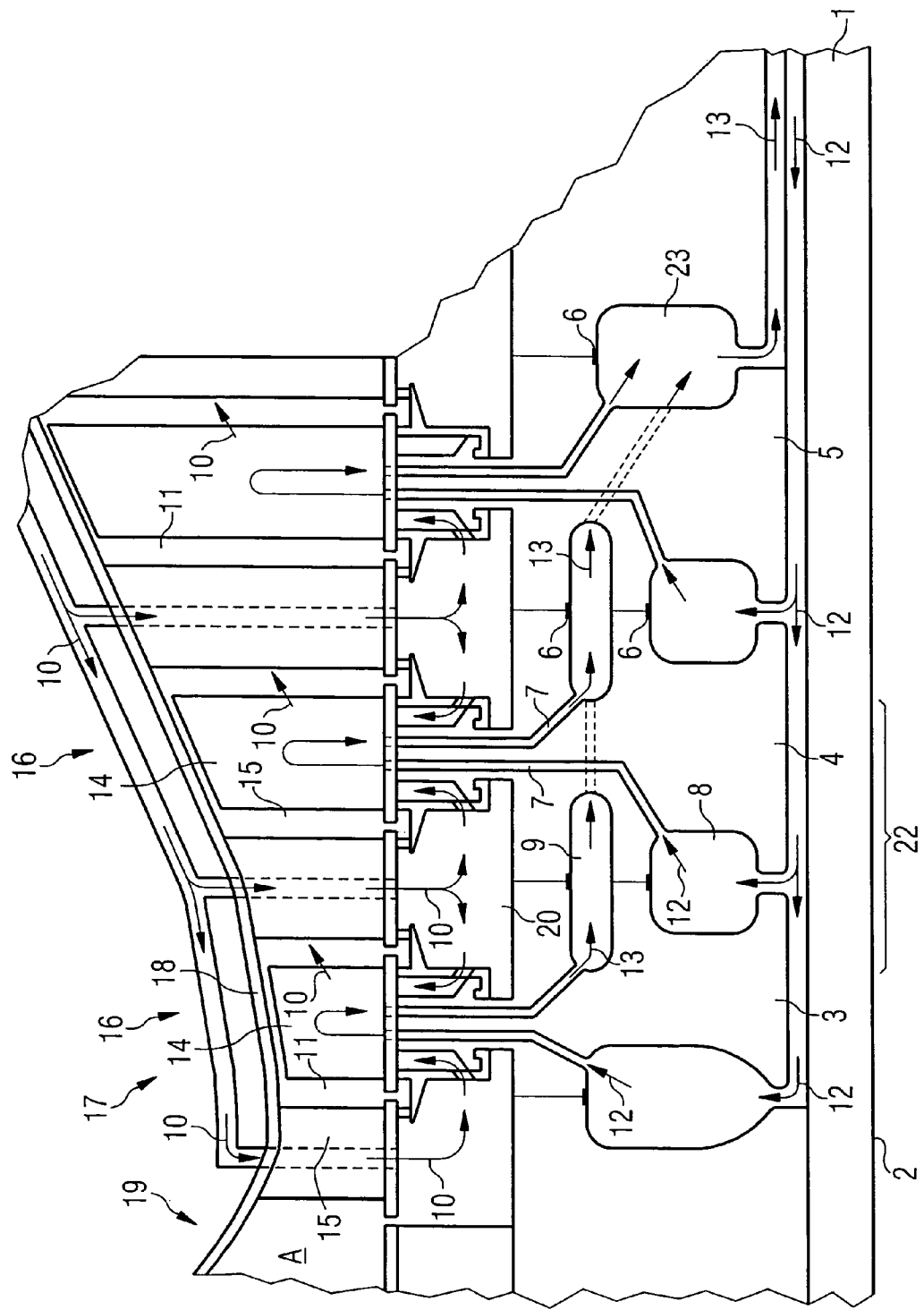

TURBINE ENGINE AND A METHOD FOR COOLING A TURBINE ENGINE

CROSS REFERENCE TO RELATED APPLICATIONS

This application claims priority to European application No. 02023472.0 EP, filed Oct. 21, 2002, and which is incorporated by reference herein in its entirety.

FIELD OF INVENTION

The invention relates to a turbine engine having a turbine shaft which has a number of adjacently arranged disks to each of which a number of blades can be fastened in a star arrangement, wherein said blades can be cooled by means of at least one coolant which flows through coolant channels inside the blades, and to a method for cooling these blades.

BACKGROUND OF INVENTION

Turbine engines are used in many fields, principally as drives in the aviation industry and for energy production. In energy production, a distinction is made between gas turbines and steam turbines, which are both used, often simultaneously in so-called gas and steam installations, for driving generators. In the gas turbine, which is examined below, a fuel/air mixture is ignited in a combustion chamber, from where the working medium produced in this process expands in the direction of the blades, performing work as it passes said blades. The energy of the working medium is converted by means of the blades into kinetic energy, which, upon rotation of the turbine shaft, is relayed to generators.

The fuel/air mixture usually burns at a temperature of 1200° C. to 1300° C., producing low emissions and thereby achieving a high degree of efficiency. The degree of efficiency can generally be further increased through a further rise in the combustion temperature.

At these high combustion temperatures of the working medium, very high demands in terms of thermal endurance, mechanical strength and service life are placed on those components of the turbine engine which come into contact with the working medium. A maximum possible degree of efficiency should be achieved here, taking into account the risk to operations and cost-effectiveness of the individual components.

Thermal endurance, a long service life and reliability are also required of the blades of a turbine engine. In order for the blades in the first row of blades, viewed in the direction of flow of the working medium, to withstand the highest thermal loadings, they are cooled in a known manner. For this purpose, they generally have cavities running through them, said cavities forming a branched system of channels in which a coolant flows. Either compressed air or steam, or else both simultaneously, is/are used as a coolant. Steam exhibits better cooling properties than compressed air. However, steam places higher demands on the sealing of the complete cooling system, which means higher production costs with regard to conduction of the coolant.

It is known that blades can be air-cooled and/or steam-cooled. Air cooling can take the form of open as well as closed cooling, but steam cooling is appropriate only as a closed cooling system. When blades of a turbine engine are cooled, the substantial difference in pressure between working medium and coolant can be maintained only by means of a high level of technical resources. In order to close off areas from one another, a costly sealing system is required along the conduction pathway of the coolant, so as to limit leakage losses and thereby ensure efficient cooling. Disadvantageous here is the enormous economic and technological outlay required for this purpose, which on top of everything leads to a reduction in operational dependability and reliability on account of the complicated technology.

Supplying coolant to individual blades in the various rows of blades is very difficult, due to the arrangement of the individual elements concerned, and demands a high outlay in order to guarantee the required sealing of the system and a low operating risk.

SUMMARY OF INVENTION

The object of the present invention is to increase the efficiency of the turbine engine at an economically justifiable cost and at the same time to reduce the operating risk and to increase the service life of the elements and the reliability of the turbine engine.

This object is achieved according to the invention in that multiple cavities are enclosed between two directly adjacent disks in a radial direction, said cavities in each case encompassing the turbine shaft in a circumferential direction and coolants being present in said cavities at different pressures, wherein the coolant or coolants can in each case flow into and out of the cavities.

The invention is based on the calculation that the operating risk can be reduced by simplifying the coolant feed to the blades. The resulting advantageous reduction in the number of seals and simultaneous shortening of the remaining length of sealing increases operational dependability, lowers the probability of failure and reduces leakage losses of the coolant. In addition, simpler sealing systems can be used which likewise reduce the operating risk. Multiple coolants of differing quality flow in the individual cavities between two adjacent disks; these are "fresh" coolants like fresh air and/or live steam which are conducted to the blades and/or "used" coolants like used air and/or used steam which are conducted away from the blades. The simple and reliable provision of coolants permits the efficient use of said coolants and consequently enables a profitable increase in efficiency, since the components exposed to the working medium withstand higher temperatures.

Extremely advantageous is the arrangement of the invention such that the radially adjacent cavities are sealed front one another by means of centrifugal force based seals. This extremely reliable method of sealing radially adjacent areas reduces the leakage loses in the coolant.

An absolutely tight and secure connection is advantageously obtained if the integrated coolant channels of each blade arranged on one and the same disk communicate via a radial bore or passage with one and the same cavity which is enclosed by means of an adjacent disk.

Advantageously, at least one of the cavities communicates with a coolant supply or coolant disposal.

According to a method for cooling a turbine engine in accordance with one of claims 1 to 4, it is proposed that the pressure of the coolant which flows through a cavity is greater than the pressure of the coolant which flows through the radially outwardly adjacent cavity. In the unfavorable event of there being a defect in an essentially very robust centrifugal-force seal, leakage losses thus occur only from one pressure level to the next lowest, i.e. from one cavity to the radially outwardly adjacent cavity.

In one version of the method according to the invention for cooling a turbine engine, it is proposed that live steam flows in the radially innermost cavity, used steam in the next outwardly adjacent cavity and fresh air in the next outwardly adjacent cavity. Gas turbines are frequently operated with multistage steam turbines (as gas-and-steam plants) which need steam at different pressures as a working medium. A proportion of the working medium steam of a high-pressure steam turbine is extracted and used for cooling components of a gas turbine. The extracted proportion of the steam is referred to in this application as live steam and has a pressure of the order of approx. 40 bar. The used steam, with a pressure of approx. 30 bar, which remains after cooling the components exposed to the hot gas, can be supplied as a working medium to a medium-pressure steam turbine The coolant steam is thus profitably used more than once. The proportions of live steam leaking in the event of a fault do so, on account of the pressure difference, only in the direction of the used steam and mix with this used steam. The used steam is again fed to the medium-pressure steam turbine, and the losses brought about by leakage are thus reduced. If a part of the used steam flows as a result of leakage in the direction of the low pressure and mixes with the fresh air, then this part, continues to be used profitably for cooling. Proportions of coolant are lost only if leakages occur between the area in which the fresh air flows and the flow channel of the working medium of the gas turbine.

The invention thus constitutes a radial multilayered system of areas shielded from one another, in which differing pressures prevail. At the same time, a pressure difference applies radially, viewed from the inside to the outside. The greatest pressure, caused by live steam, applies in the innermost cavity, viewed radially, of two adjacent disks, the next lowest pressure, caused by used steam, in the next cavity radially further outward, the next lowest pressure, caused by fresh air, in the outermost cavity, and the lowest pressure, caused by the working medium, applies in the flow channel which is arranged between turbine shaft and stator. Advantageous are the short sealing lengths running between the disks in a circumferential direction coupled with the low number of sealing elements and the beneficial layered arrangement of coolants of differing pressure which enable profitable partial reuse of the leakage flow.

By way of example, the invention is described in greater detail with reference to the drawing. The single FIGURE in the drawings shows, in part diagrammatically and not to scale, a gas turbine with a turbine shaft.

BREIF DESCRIPTION OF THE DRAWINGS

FIG. 1 shows a section through a gas turbine

DETAILED DESCRIPTION OF INVENTION

The single FIGURE in the drawings shows a section through a gas turbine 17 along the axis of rotation 2 of the turbine shaft 1. Arranged adjacently on the turbine shaft 1 are the disks 3, 4 and 5. Fastened to each of these disks 3, 4 and 5 are blades 14 grouped in blade rings 16 of the first, second and third turbine stage. Each turbine stage is formed by a vane ring mounted on the stator 18 in conjunction with a blade ring 16 downstream of this vane ring, viewed in the direction of flow of the working medium A. Also, the guide vanes 15 are supplied with fresh air via an external supply not shown, which is represented by the direction-of-flow arrows 10.

The partially shown combustion chamber 19 of the gas turbine 17 runs into the flow channel 11 of the working medium A. During operation of the gas turbine 17, the working medium A flows, coming from the combustion chamber 19, through the flow channel 11. As it does so, it flows past guide vanes 15 and performs work on the blades 14.

The disks 3, 4 and 5 arranged adjacently on the turbine shaft 1 enclose between them cavities 8, 9, 20 which encompass the turbine shaft in the shape of a ring. The inner cavity 8 lies radially inward relative to the middle cavity 9. In an outward radial direction, the outer cavity 20 encompasses the middle cavity 9. The inner cavity 8 is sealed relative to the middle cavity 9 by means of a centrifugal-force-based seal 6 which is likewise sealed relative to the cavity 20 via a centrifugal-force-based seal. Not shown is that the centrifugal-force-based seal consisting of a sealing wire is laid on both adjacent disks in a chamfer in order to position these securely. The inner cavity 8 has a bore or a passage 7 via which the cavity 8 communicates with the supply terminal of the integrated coolant channel of the blades 14. The inner cavity 8 thus serves to supply coolant to the blades 14. The cavity 9 likewise has a bore 7, which communicates with the outlet terminal of the integrated coolant channel of the blades 14, for discharging coolant.

The coolant flow is explained with reference to the second turbine stage 22. Live steam flows, shown by the arrows 12 indicating the direction of flow of the live steam, from a coolant source axially along the turbine shaft 1 as far as the inner cavity 8 which is formed between the disks 3 and 4. The live steam is conducted through the radially running bore 7 which runs through the disk 4 to a supply terminal of a blade 14 of the second turbine stage 22. In the blade 14, the live steam has a cooling effect and leaves this blade via the outlet terminal. The other radial bore 7 arranged at the outlet terminal conducts the used steam, shown by the direction-of-flow arrows 13, to the middle cavity 9, which is enclosed by the disks 4 and 5. From there, the used steam passes through an axial channel to a further cavity 23, from where it is evacuated.

From a fresh-air source not shown, fresh air 10 is conducted through the guide vanes 15 to a cavity 20 which is located radially further outward than the cavity 9. From this cavity 20, the fresh air is fed to the blades 14. The fresh air blown out at the trailing edge of the blades 14 then mixes with the working medium A of the gas turbine 17.

Through the inventive arrangement of forming co-axial, radially spaced cavities 8, 9, 20 between the disks 3, 4 and 5, and of sealing these simply and reliably by means of centrifugal-force-based seals 6, a profitable arrangement is achieved. In conjunction with the method of pressurizing the cavities 8, 9 and 20 with coolants of differing quality and with differing pressures, wherein these pressures decrease from the inside to the outside, a significant improvement is achieved compared with the state of the art.

The invention claimed is:

1. A turbine shaft in a turbine engine, comprising:
a first cooling circuit characterized by a first region separated flow wise from a third region by a second region, said first cooling circuit being further characterized by a fourth region, a fifth region and a sixth region connected flow wise to one another to pass fresh air but separated flow wise from the first, second, and third regions;
wherein the first region contains live steam during operation,
wherein the third region contains used steam during operation,
wherein the second region is located within a first bade,
wherein the fourth region is located within a first guide vane to pass fresh air therethrough to the fifth region, wherein the fifth region passes fresh air received from the fourth region to the sixth region, and wherein the sixth region is located within the first blade and passes therethrough fresh air received from the fifth region; and a second cooling circuit characterized by a first region separated flaw wise from a third region by a second region, said second cooling circuit being further characterized by a fourth region, a fifth region and a sixth region connected flow wise to one another to pass fresh air but separated flow wise from the first, second, and third regions;

wherein the first region contains live steam during operation, wherein the third region contains used steam during operation, and wherein the second region is located within a second blade, wherein the fourth region is located within a second guide vane to pass fresh air therethrough to the fifth region, wherein the fifth region passes fresh air received from the fourth region to the sixth region, and wherein the sixth region is located within the second blade and passes therethrough fresh air received from the fifth region;

wherein each first region is in communication flow wise with a source of live steam during operation, and whereby each of the cooling circuits is effective to maximize cooling efficiency by delivering live steam to each of the cooling circuit first regions and by delivering fresh air through the fourth, fifth and sixth regions.

2. The turbine shaft according to claim 1, wherein the third region of the first circuit communicates flow wise with the third region of the second circuit.

3. The turbine shaft according to claim 2, further comprising a coolant exit in communication flow with at least one of the third regions.

4. The turbine shaft according to claim 2, wherein the third region of the first circuit is sealed from the first region of the second circuit during operation.

5. The turbine shaft according to claim 4, wherein the third region of the first circuit is located radially outward from the first region of the second circuit.

6. The turbine shaft according to claim 4, wherein a pressure of the live steam is greater than a pressure of the used steam.

7. A turbine shaft in a turbine engine, comprising:

a first cooling circuit characterized by a first region separated flow wise from a third region by a second region, said first cooling circuit is further characterized by a fourth region, a fifth region and a sixth region connected flow wise to one another to pass fresh air but separated flow wise from the first, second, and third regions;

wherein the first region contains live steam during operation, wherein the third region contains used steam during operation, wherein the second region is located within a first blade, wherein the fourth region is located within a first guide vane to pass fresh air therethrough to the fifth region, wherein the fifth region passes fresh air received from the fourth region to the sixth region, and wherein the sixth region is located within the first blade and passes therethrough fresh air received from the fifth region;

a second cooling circuit characterized by a first region separated flow wise from a third region by a second region, said first cooling circuit being further characterized by a fourth region, a fifth region and a sixth region connected flow wise to one another to pass fresh air but separated flow wise from the first, second, and third regions;

wherein the first region contains live steam during operation, wherein the third region contains used steam during operation, and wherein the second region is located within a second blade, wherein the fourth region is located within a second guide vane to pass fresh air therethrough to the fifth region, wherein the fifth region passes fresh air from the fourth region to the sixth region, and wherein the sixth region is located within the second blade and passes therethrough fresh air received from the fifth region; and a coolant exit in communications flow with at least one of the third regions, wherein the third region of the first circuit communicates flow wise with the third region of the second circuit, whereby the first and second blades are cooled by the live steam and the fresh air during operation.

8. The turbine shaft according to claim 7, wherein the third region of the first circuit is sealed from the first region of the second circuit during operation.

9. The turbine shaft according to claim 7, wherein the third region of the first circuit is located radially outward from the first region of the second circuit.

* * * * *